US007984670B2

(12) United States Patent
Sequera et al.

(10) Patent No.: US 7,984,670 B2
(45) Date of Patent: Jul. 26, 2011

(54) HYDRAULIC DISTRIBUTOR PROVIDED WITH A DEVICE FOR DETECTING SEIZING

(75) Inventors: Damien Sequera, Nimes (FR); Vincent Schwaller, Marignane (FR)

(73) Assignee: Eurocopter, Marignane Codex (FR)

( * ) Notice: Subject to any disclaimer, the term of this patent is extended or adjusted under 35 U.S.C. 154(b) by 589 days.

(21) Appl. No.: 12/125,078

(22) Filed: May 22, 2008

(65) Prior Publication Data

US 2008/0289487 A1 Nov. 27, 2008

(30) Foreign Application Priority Data

May 24, 2007 (FR) ..................................... 07 03672

(51) Int. Cl.
*F15B 20/00* (2006.01)
*B64C 13/42* (2006.01)

(52) U.S. Cl. ................................ 91/509; 91/1; 137/554

(58) Field of Classification Search .................... 60/403; 91/1, 509; 137/554; 244/226
See application file for complete search history.

(56) References Cited

U.S. PATENT DOCUMENTS

| | | | | | |
|---|---|---|---|---|---|
| 3,529,514 | A | | 9/1970 | Mayo et al. | |
| 3,613,504 | A | * | 10/1971 | Krauss | 244/226 |
| 4,335,745 | A | | 6/1982 | Bouveret et al. | |
| 4,967,792 | A | * | 11/1990 | Magee | 137/554 |
| 5,899,226 | A | * | 5/1999 | Devaud et al. | 137/554 |
| 2005/0132877 | A1 | | 6/2005 | Hart | |

FOREIGN PATENT DOCUMENTS

| | | | |
|---|---|---|---|
| GB | 2 165 213 | A | 9/1985 |
| WO | 2006/088488 | A2 | 8/2006 |

* cited by examiner

*Primary Examiner* — Thomas E Lazo
(74) *Attorney, Agent, or Firm* — Brooks Kushman P.C.

(57) ABSTRACT

The present invention relates to a hydraulic distributor (2) of a servo-control (1) of an aircraft, the hydraulic distributor comprising main distributor member (10) and emergency distributor member (20) that are coaxial, said emergency distributor member (20) being caused to move by said main distributor member (10) in the event of said main distributor member (10) seizing, said hydraulic distributor being provided with a detector device (60) for detecting said seizing. The detector device (60) is provided with a reed switch (66) and with amplification means (62, 69, 68) for amplifying said movement of the emergency distributor member, said amplification means comprising a lever (62) having a magnetized free end (62') that activates said reed switch (66) in the event of said emergency distributor member (20) moving.

20 Claims, 2 Drawing Sheets

HYDRAULIC DISTRIBUTOR PROVIDED WITH A DEVICE FOR DETECTING SEIZING

The present invention relates to a hydraulic distributor, in particular of an aircraft servo-control, which hydraulic distributor is provided with a device for detecting seizing, and the aircraft being constituted for example by a rotorcraft, and in particular by a helicopter.

BACKGROUND OF THE INVENTION

More particularly, a helicopter is provided with a main rotor providing it with lift and propulsion. In order to direct the helicopter, a pilot modifies the pitch of the blades of the main rotor, i.e. their angle of incidence relative to the incident air flow.

Consequently, the rotorcraft includes a swashplate provided with a stationary lower swashplate and a rotary upper swashplate. The stationary lower swashplate is connected to pilot flight controls, generally via three distinct control lines, while the rotary upper swashplate is connected to each of the blades via a respective rod.

The swashplate is thus a controlling swashplate that slides vertically along the mast of the main rotor while oscillating in all directions about a ball joint.

The oscillations and the vertical travel of the swashplate, as controlled by the pilot, give rise to the variation in the pitch of the blades that enable the pilot to direct the helicopter.

Conventionally, the pilot controls the swashplate via mechanical controls that are connected to the swashplate by rods. Nevertheless, the forces the pilot needs to exert in order to move the swashplate are very large.

Consequently, a servo-control is then arranged on each of the control lines. The pilot then acts on the servo-controls without making any particular effort, and the servo-controls then relay the order from the pilot to the swashplate and consequently adjust the pitch of the blades in the required manner.

Similarly, a helicopter is provided with a tail rotor and the pitch of its blades can be adjustable via a servo-control.

Naturally, the same applies to airplane ailerons, for example, when operated via servo-controls.

It should be observed that certain modern aircraft have electrical controls that replace the mechanical connections connecting the flight controls to the servo-controls.

In usual manner, servo-controls comprise at least an outer cylinder surrounding a piston, with the movement of the piston relative to the cylinder being controlled by a hydraulic distributor actuated by the flight controls of the helicopter pilot.

Two embodiments then coexist.

In a first embodiment, the piston is secured to a fixed point of the helicopter with the cylinder moving to act on the swashplate. The person skilled in the art refers to this type of servo-control as a “moving cylinder servo-control”, In contrast, in a second embodiment, the cylinder is secured to a fixed point of the helicopter with the piston then moving to act on the swashplate. The person skilled in the art thus refers to this type of servo-control as a “moving piston servo-control”.

In addition, regardless of the embodiment, servo-controls can be of the kinds referred to as “single cylinder” or as “two-cylinder”.

A single cylinder servo-control then has a cylinder defining a retraction chamber and extension chamber separated by a piston. The retraction chamber and the extension chamber are then fed from a single hydraulic valve.

Such a servo-control performs its function well. Nevertheless, for safety reasons, the person skilled in the art tends to use a two-cylinder servo-control when forces exceed a certain level.

A two-cylinder servo-control then has a bottom cylinder and a top cylinder both surrounding a respective piston. In each of the cylinders, the piston defines a retraction chamber and an extension chamber.

In addition, two distinct hydraulic distributors actuated by a common input lever connected to the pilot controls serves to feed the retraction and extension chambers in the bottom and top cylinders, respectively.

It will readily be understood that the person skilled in the art requires complete reliability from the servo-controls, which is to be expected, since any malfunction of a servo-control is generally considered as a failure that is catastrophic from the safety point of view.

Cylinder redundancy thus serves to address the problem of safety. Nevertheless, it is also essential for each of the hydraulic valves that actuates a respective servo-control cylinder, to be completely safe itself.

Document FR 2 460 435 discloses a first hydraulic distributor having rotary distributor members.

The hydraulic distributor has a cylindrical main distributor member referred to as a “core”, that is mounted to turn in a stationary sleeve.

In addition, an emergency distributor member is arranged between the sleeve and the main distributor member.

The sleeve has bores for feeding fluid under pressure to the retraction and extension chambers in such a manner as to cause the cylinder to move.

In addition, the core is provided with passages having progressive openings that are arranged in its periphery so as to allow hydraulic fluid to flow from one bore of the sleeve to another when the core is turned by a manual control.

Likewise, the emergency distributor member is pierced by radial openings to allow fluid to pass from one bore of the sleeve to another if the emergency distributor member is turned.

In normal operation, the main distributor member is not suitable for causing the emergency distributor member to turn. Nevertheless, in the event of the main distributor member seizing, it then entrains the emergency distributor member by friction, thereby allowing fluid to flow from one bore in the sleeve to another.

Consequently, the hydraulic distributor operates correctly even in the event of seizing.

Nevertheless, in such a situation, it is appropriate to warn the pilot of the aircraft that the servo-control is not operating properly. The servo-control is therefore fitted with a device for detecting seizing.

On turning, the emergency distributor member sets three balls into axial movement, which move a lever via a plate. The lever moves a rod that actuates a contactor to trigger an alarm. For questions of sealing, the rod is provided with a dynamic sealing gasket to keep the contactor separate from the hydraulic system of the hydraulic distributor, with the gasket being said to be dynamic insofar as it provides sealing relative to a moving part.

That detector device is effective. Nevertheless, the presence in particular of the dynamic gasket is problematic since it is difficult and expensive to obtain good long-term reliability from such a dynamic seal.

The dynamic gasket can then sometimes lead to harmful hydraulic leakage, requiring the servo-control to be dismantled for repair. Such an operation is expensive, in particular in terms of maintenance hours and of aircraft unavailability.

A second servo-control is also known that has a second hydraulic distributor provided with main and emergency distributor members that are substantially cylindrical, and that move not in rotation but axially, referred to respectively as the "main slide" and as the "emergency slide".

The main distributor member then moves along its own axis of symmetry to allow hydraulic fluid to pass from one bore of the sleeve to another.

In the event of seizing, the main distributor member moves along the emergency valve member along said axis of symmetry, thereby allowing the hydraulic fluid to pass.

That second hydraulic distributor is fitted with a device for detecting seizing.

A rod perpendicular to the said axis of symmetry is secured at one end to the emergency distributor member. That first rod is provided with a dynamic seal keeping the device for detecting seizing separate from the hydraulic system of the second hydraulic distributor.

Under the effect of the emergency valve member moving in translation, the rod causes a plurality of levers to pivot, thus actuating an electrical contactor to trigger an alarm.

As above, the second hydraulic valve with slides gives satisfaction but the problems associated with hydraulic leakage via the dynamic gasket remain.

OBJECTS AND SUMMARY OF THE INVENTION

An object of the present invention is thus to provide a hydraulic distributor for a servo-control that is fitted with a device for detecting and signaling seizing, but that is completely leaktight and does not run any risk of leaking in the medium term.

According to the invention, a hydraulic distributor for an aircraft servo-control includes a main distributor member and an emergency distributor member that are coaxial, the emergency distributor member being set into movement by the main distributor member in the event of the main distributor member seizing. In addition, the hydraulic distributor is provided with a detector device for detecting seizing in order to satisfy safety requirements.

The hydraulic distributor is remarkable in that the detector device is provided with a reed switch and with amplification means for amplifying the movement of the emergency distributor member, the amplification means comprising a lever having a magnetized free end that activates the reed switch in the event of the emergency distributor member moving.

More precisely, a reed switch is an electric switch controlled by a magnetic field. It is provided with a main blade and with two secondary blades arranged within a bulb. The main blade is normally in contact with a first secondary blade but, under the effect of a magnetic circuit, it switches over to come into contact with the second secondary blade.

Such a reed switch is a bulb sensor also known as an "intelligent line switch (ILS)" by the person skilled in the art.

It should be observed that the use of a reed switch is most surprising in the present circumstances. The movement of the emergency distributor member is very small, of the order of 0.2 millimeters (mm), and that would not appear to correspond with the detection range needed by a reed switch, since they require a minimum movement of 1 mm. The reed switch is thus normally used for movements that are greater, e.g. in the context of an end-of-stroke contactor.

The prejudice overcome by the invention makes it nevertheless possible to use such a reed switch in the device for detecting seizing.

Because of the presence of the bulb, the device for detecting seizing can be immersed in the hydraulic fluid of the hydraulic distributor. There is therefore no longer any need to use a dynamic gasket to separate the detector device from the hydraulic fluid, thereby considerably limiting any risk of leakage.

In order to enable the equipment of the aircraft to know that the main distributor member of a servo-control has seized, the detector device includes warning means arranged in the cockpit of the aircraft, the reed switch thus operating the warning means on being activated by the magnetized free end, and more precisely by a magnet arranged in said magnetized free end.

In the event of seizing, the main distributor member is secured to the emergency distributor member, which is thus caused to move. The emergency distributor member then moves the magnetized free end of the lever of the detector device for detecting seizing. Therefore, the magnetic field created by the magnet at the magnetized free end of the lever causes the main blade of the reed switch to switch over, thereby activating the warning means, e.g. an audible or visible alarm.

The use of a lever serves to amplify the movement of the emergency valve member so as to make it detectable by the bulb sensor.

In one embodiment, the lever has a first surface that is in contact at least in part with the emergency distributor member.

In addition, the amplification means may include a return spring in contact with a second surface of the lever, the second surface being opposite to a first surface of the lever that is in contact with the emergency distributor member.

Advantageously, the main distributor member has an end portion that projects from the emergency distributor member, the lever being U-shaped in order to go round the end portion.

Furthermore, in a first variant, the amplification means include a magnetic screen surrounding the magnetized free end of the lever to focus the magnetic field created by the magnetized free end towards the reed switch. This makes it possible to ensure that the small movement of the emergency distributor member and of the lever will indeed be detected by the reed switch.

Similarly, in a second variant, the amplification means includes at least one magnetic lens in order to focus the magnetic field created by the magnetized free end towards the reed switch.

The or each magnetic lens arranged between the reed switch and the magnet at the magnetized free end of the lever is then constituted by a cylinder of material having magnetic permeability that is very high compared with the other materials in its vicinity.

Optimally, the or each magnetic lens is directed towards the reed switch and is perpendicular to a longitudinal axis of the reed switch.

The first and second variants can be combined in order to maximize the focusing of the magnetic field created by the magnetized free end.

Finally, in addition to a main housing surrounding the main and emergency distributor member, the detector device includes a secondary housing that plugs the main housing, a static gasket being disposed between the main housing and the secondary housing.

Since sealing is usually perfect with a static gasket, i.e. a gasket that provides sealing between two parts that do not move relative to each other, the risks of leakage is very small or zero, even in the long term. In addition, manufacturing and maintenance costs are smaller when using a static gasket.

Furthermore, the secondary housing includes support means through which the reed switch passes, and on which the lever is hinged so that the lever can pivot when the emergency distributor member moves.

BRIEF DESCRIPTION OF THE DRAWINGS

The invention and its advantages appear in greater detail in the context of the following description of embodiments given by way of illustration with reference to the accompanying figures, in which.

Elements present in more than one figure are given the same reference in each of them.

MORE DETAILED DESCRIPTION

Figure 1:
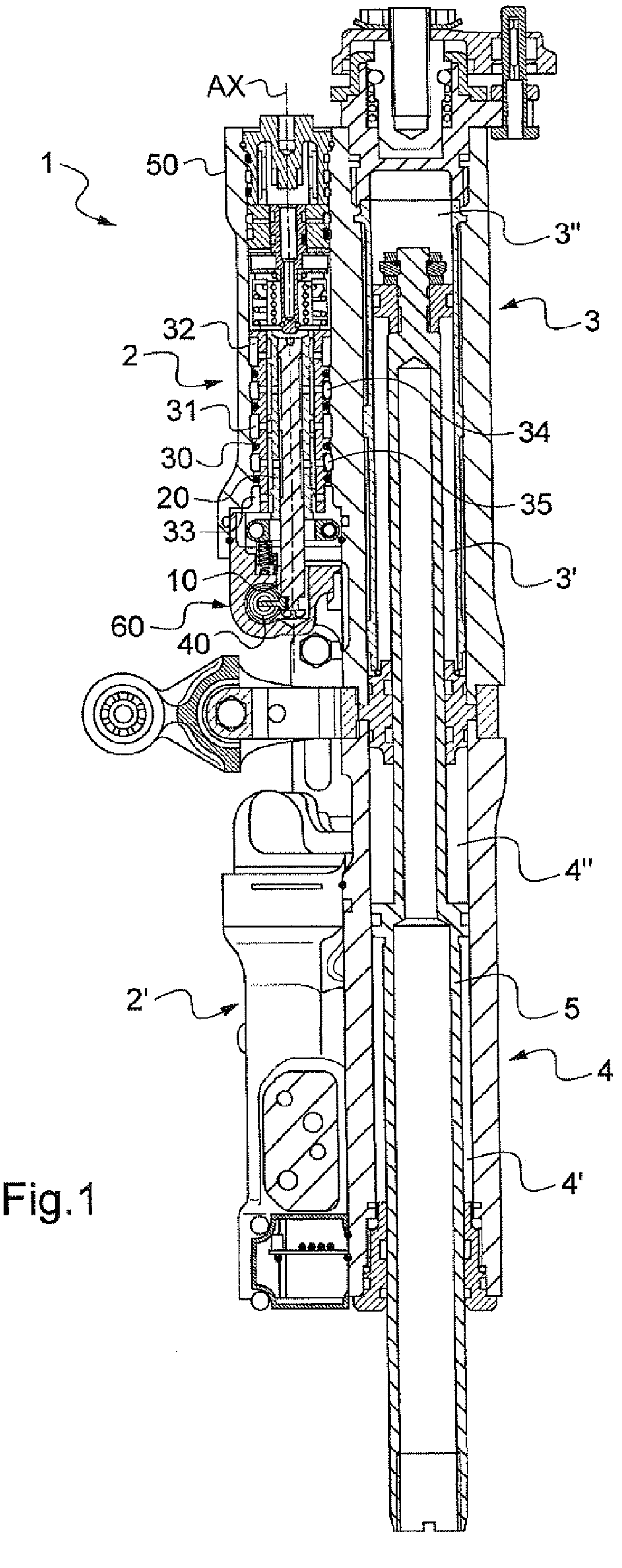
FIG. 1 is a section view of a servo-control provided with a hydraulic distributor of the invention.

FIG. 1 is a section view of a servo-control 1 provided with a hydraulic valve 2 of the invention.

The servo-control 1 has two cylinders and two distributors. It has a top cylinder 3 and a bottom cylinder 4 surrounding a piston 5 that is secured to the aircraft.

Within each top and bottom cylinder 3 and 4, the piston 5 defines a retraction chamber 3", 4", and an extension chamber 3', 4'.

Furthermore, each of the top and bottom cylinders 3 and 4 is fitted with a respective hydraulic distributor 2, 2'. These hydraulic distributors serve to vary pressure in the retraction and extension chambers 3", 4" & 3', 4' to move both the top and bottom cylinders 3 and 4 relative to the piston 5.

Consequently, the hydraulic distributor 2 of the top cylinder 3 comprises main distributor member 10 and emergency distributor member 20 that are substantially cylindrical and coaxial.

These main and emergency distributor members 10 and 20 extend along a vertical axis AX that also constitutes their own axis of symmetry.

Furthermore, the main and emergency distributor members 10 and 20 are arranged inside a sleeve 30, the assembly being surrounded by a main housing 50.

The sleeve 30 includes, in particular, five holes 31, 32, 33, 34, and 35. The first hole 31 constitutes an inlet for hydraulic fluid under pressure, some oil for example.

The fourth and fifth holes 34 and 35 represent outlets connected respectively to the retraction chamber 31 and the extension chamber 3' of the top cylinder 3 via pipes that are not shown.

Finally, the second and third holes 32 and 33 constitute hydraulic fluid return orifices.

The main and emergency distributor members 10 and 20 also include passages for enabling fluid to flow from one hole in the sleeve to another.

The servo-control 1 is controlled by means of a member 40, e.g. a activated by a pilot, via a mechanical system that is not shown in the figures.

When the pilot requires the servo-control 1 to retract, the member 40 acts on the main distributor member 10 which moves longitudinally upwards.

By moving longitudinally, along the vertical axis AX, the main distributor member 10 put the first hole 31 in communication with the fifth hole 35. Hydraulic fluid under pressure is thus sent to the retraction chamber 3". The pressure therein increases, thus inducing the cylinder of the servo-control to move downwards in translation relative to the piston 5.

Consequently the fluid contained in the extension chamber 31 escapes via the fourth hole 34 and goes towards the second hole 32 in order to be reinjected into the circuit.

In contrast, when the pilot requires the servo-control 1 to extend, the member 40 acts on the main distributor member 10 which moves longitudinally downwards.

By moving longitudinally along the vertical axis AX, the main distributor member 10 puts the first hole 31 into communication with the fourth hole 34. Hydraulic fluid under pressure is thus sent towards the extension chamber 3'. The pressure therein increases, thereby causing the cylinder of the servo-control to move upwards in translation relative to the piston 5.

Consequently, the fluid contained in the retraction chamber 3" escapes via the fifth hole 35 and goes to the third hole 33 in order to be reinjected into the circuit.

Naturally, it will be understood that the hydraulic distributor of the second cylinder 4 operates identically and simultaneously with the hydraulic distributor of the first cylinder 3.

In the event of seizing, i.e. when the main distributor member tend to jam, the main distributor member 10 in its movement in translation entrains the emergency distributor member 20. The emergency distributor member then puts the appropriate holes in the sleeve 30 into communication, thereby compensation for the failure of the main distributor member 10.

In order to detect such seizing, each hydraulic distributor 2 is fitted with a seizing detector device 60.

Figure 2:
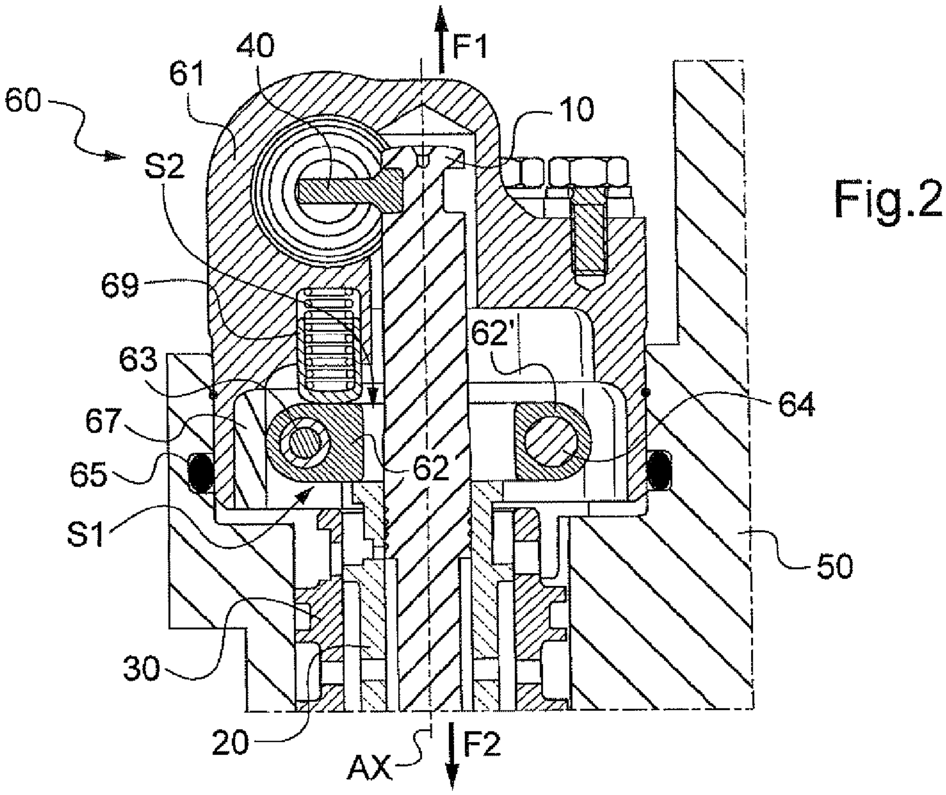
FIG. 2 is a section view of the detector device on a first plane.
Figure 3:
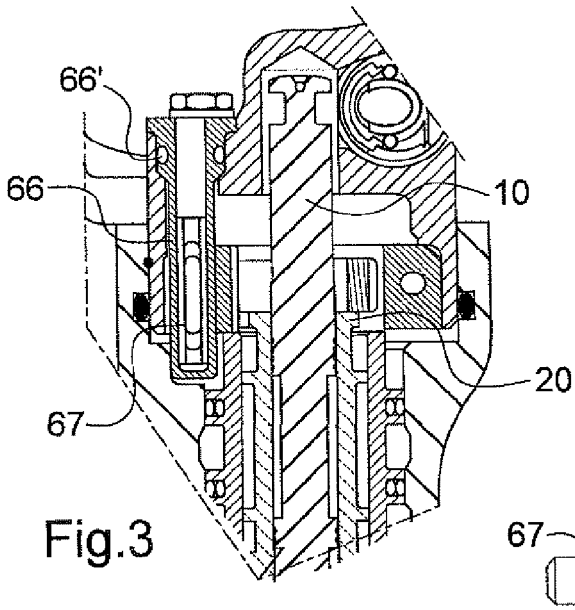
FIG. 3 is a section view of the detector device on a second plane.

FIGS. 2 and 3 are longitudinal sections through the detector device 60 on first and second planes that are at an angle to each other.

The detector device has a secondary housing 61 plugging the main housing 50 which surrounds in part the main distributor member 10, the emergency distributor member 20, and the sleeve 30.

A static gasket 65 is then arranged between the main housing 50 and the secondary housing 61, thereby ensuring good sealing at the interface between the main housing 50 and the secondary housing 61.

In addition, the secondary housing 61 of the detector device is provided with support means 67. With reference to FIG. 2, a reed switch 66 passes through the secondary housing 61 and the support means 67, with a static gasket 66' being disposed between the secondary housing 61 and the reed switch 66.

Sealing is thus provided solely by means of static gaskets 66', 65, thereby providing a clear advantage over devices of the prior art.

In addition, the detector device is provided with means for amplifying the movement of the emergency distributor member 20 in the event of the main distributor member 10 seizing.

The amplification means comprise a lever 62 having a hinged end fastened to the support means 67 via a hinge 63 enabling the magnetized free end 62' of the lever to perform a rotary movement.

In order to be magnetized, the magnetized free end 62' of the lever possesses a magnet 64 suitable for generating a magnetic field.

Furthermore, the lever 62 has a First surface S1 in contact with the emergency distributor member 20.

With reference to FIG. 2, when the main distributor member has seized, if it moves along arrow F1, it causes the emergency distributor member to move along said arrow F1.

The emergency distributor member then move over a very short distance, e.g. 0.2 mm to 0.5 mm.

Since the lever 62 is in contact with the emergency distributor member 20, the movement of the emergency distributor member 20 causes the lever 62 to pivot about the hinge 63 in a counterclockwise direction, with the emergency distributor member 20 pushing the lever 62.

The movement of the emergency distributor member 20 is thus amplified insofar as a short linear movement at the contact surface S1 of the lever 62 corresponds to a longer linear movement of its magnetized free end 62', a multiplication factor of four being provided between these two linear movements, for example.

The magnetic field generated by the magnetized free end 62' is then moved, thereby enabling the reed switch 66 to be activated.

Advantageously, the reed switch then sends a signal to warning means of the detector device, which warning means are arranged in the cockpit of the aircraft to operate and trigger an audible or visible alarm.

With reference to FIG. 2, when the main distributor member has seized, it moves along arrow F2 and causes the emergency distributor member to move along said arrow F2.

The amplification means then includes a return spring 69 in contact with a second surface S2 of the lever, opposite the first surface S1.

The emergency distributor member 20 then remains in contact with the lever 62 under the action of the return spring 69, thereby enabling the lever 62 to follow the movement of the emergency distributor member 20.

When the emergency distributor member 20 moves downwards in translation, the return spring 69 presses against the lever 62 and tends to relax. It thus pushes the lever 62, which pivots about the hinge 63 in the clockwise direction in FIG. 2.

The magnetic field generated by the magnetized free end 62' is then moved, thereby enabling the reed switch 66 to be activated and thus activating the warning means arranged in the cockpit.

Figure 4:
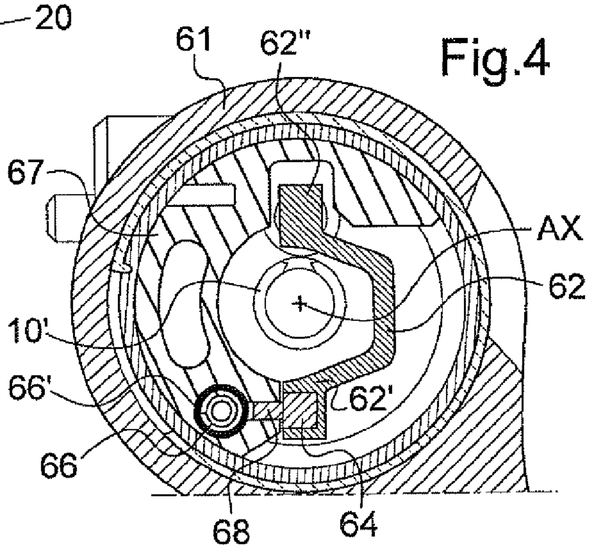
FIG. 4 is a radial section of the detector device.

FIG. 4 is a section through the detector device 60.

The detector device 60 has a secondary housing 61, support means 67 being secured to said secondary housing 61.

In addition, the device is provided with a reed switch 66 that passes longitudinally, i.e. parallel to the axis AX, through the secondary housing 61 and the support means 67.

The amplification means of the detector device is provided in particular with a lever 62 having a hinged end 62" that is fastened to the support means 67 via a hinge, the hinge allowing the lever 62 to perform a rotary movement.

Furthermore, the main distributor member 10 has an end portion 10' that projects from the emergency distributor member 20 in order to be controlled by a member 40, shown in FIGS. 1 and 2 and activated by the pilot of the aircraft.

This end portion is then arranged inside the secondary housing 61 of the seizing detector device.

In order to go round this end portion, the lever 62 is substantially U-shaped.

In addition, in a first variant, the amplification means advantageously includes a magnetic screen (not shown in the figures) surrounding the magnetized free end 62' of the lever 62.

The magnetic screen, e.g. of cylindrical shape, focuses the magnetic field towards the reed switch 66. Thus, if the movement of the lever 62 is not sufficient to enable the reed switch to be activated, said activation is nevertheless made possible by the focusing that is performed.

Similarly, in a second variant, the amplification means includes one or more magnetic lenses 68 arranged between the magnetized free end 62' and the reed switch 66, being secured on the support means 67.

These magnetic lenses 68 are directed towards the reed switch 66 and are perpendicular to the longitudinal axis 661 of the reed switch.

The magnetic lenses then serve to focus the magnetic field generated by the magnetized free end 62' towards the bulb sensor 66.

It should be observed that the main distributor member 10, and thus the emergency distributor member 20, are suitable for moving in two opposite directions. Thus, the amplification means advantageously has two magnetic lenses 68, one magnetic lens being provided for movement of the emergency distributor member in one direction, and another magnetic lens being provided for movement of the emergency distributor member in the other direction.

Naturally, the present invention can be subjected to numerous variants as to its implementation. Although several variants are described above, it will readily be understood that it is not conceivable to identify exhaustively all possible embodiments. Naturally, it is possible to envisage replacing any of the means described by equivalent means without going beyond the ambit of the present invention.

What is claimed is:

1. A hydraulic distributor of a servo-control of an aircraft, the hydraulic distributor comprising main distributor member and emergency distributor member that are coaxial, said emergency distributor member being caused to move by said main distributor member in the event of said main distributor member seizing, said hydraulic distributor being provided with a detector device for detecting said seizing, wherein said detector device is provided with a reed switch and with amplification means for amplifying said movement of the emergency valve member, said amplification means comprising a lever having a magnetized free end that activates said reed switch in the event of said emergency distributor member moving, wherein said lever has a first surface that is in contact at least in part with said emergency distributor member.

2. A hydraulic distributor according to claim 1, wherein said detector device includes warning means arranged in the cockpit of said aircraft, said reed switch controlling said warning means on being activated by said magnetized free end.

3. A hydraulic distributor according to claim 1, wherein said amplification means includes a return spring in contact with a second surface of said lever, said second surface being opposite to said first surface of said lever that is in contact with said emergency distributor member.

4. A hydraulic distributor according to claim 1, wherein said main distributor member has an end portion that projects from said emergency distributor member, said lever being U-shaped in order to go round said end portion.

5. A hydraulic distributor according to claim 1, wherein said amplification means include a magnetic screen surrounding said magnetized free end of said lever to focus the magnetic field created by the magnetized free end towards said reed switch.

6. A hydraulic distributor according to claim 1, wherein said amplification means includes at least one magnetic lens arranged between said magnetized free end of said lever and said reed switch in order to focus the magnetic field created by the magnetized free end towards said reed switch.

7. A hydraulic distributor according to claim 6, wherein said at least one magnetic lens is directed towards said reed switch and is perpendicular to a longitudinal axis of said reed switch.

8. A hydraulic distributor according to claim 1, wherein a main housing surrounds said main and emergency distributor member, and said detector device includes a secondary housing that plugs said main housing, a static gasket being disposed between said main housing and said secondary housing.

9. A hydraulic distributor according to claim 8, wherein said secondary housing includes support means through which said reed switch passes, and on which said lever is hinged.

10. A hydraulic distributor according to claim 1, wherein said magnetized free end includes a magnet.

11. A hydraulic distributor of a servo-control of an aircraft, the hydraulic distributor comprising main distributor member and emergency distributor member that are coaxial, said emergency distributor member being caused to move by said main distributor member in the event of said main distributor member seizing, said hydraulic distributor being provided with a detector device for detecting said seizing, wherein said detector device is provided with a reed switch and with amplification means for amplifying said movement of the emergency valve member, said amplification means comprising a lever having a magnetized free end that activates said reed switch in the event of said emergency distributor member moving, wherein said main distributor member has an end portion that projects from said emergency distributor member, said lever being U-shaped in order to go round said end portion.

12. A hydraulic distributor according to claim 11, wherein said detector device includes warning means arranged in the cockpit of said aircraft, said reed switch controlling said warning means on being activated by said magnetized free end.

13. A hydraulic distributor according to claim 11, wherein said amplification means includes a return spring in contact with a second surface of said lever, said second surface being opposite to a first surface of said lever that is in contact with said emergency distributor member.

14. A hydraulic distributor according to claim 13, wherein said lever has a first surface that is in contact at least in part with said emergency distributor member.

15. A hydraulic distributor according to claim 11, wherein said amplification means include a magnetic screen surrounding said magnetized free end of said lever to focus the magnetic field created by the magnetized free end towards said reed switch.

16. A hydraulic distributor of a servo-control of an aircraft, the hydraulic distributor comprising main distributor member and emergency distributor member that are coaxial, said emergency distributor member being caused to move by said main distributor member in the event of said main distributor member seizing, said hydraulic distributor being provided with a detector device for detecting said seizing, wherein said detector device is provided with a reed switch and with amplification means for amplifying said movement of the emergency valve member, said amplification means comprising a lever having a magnetized free end that activates said reed switch in the event of said emergency distributor member moving, wherein said amplification means includes at least one magnetic lens arranged between said magnetized free end of said lever and said reed switch in order to focus the magnetic field created by the magnetized free end towards said bulb sensor.

17. A hydraulic distributor according to claim 16, wherein said detector device includes warning means arranged in the cockpit of said aircraft, said reed switch controlling said warning means on being activated by said magnetized free end.

18. A hydraulic distributor according to claim 16, wherein a main housing surrounds said main and emergency distributor member, and said detector device includes a secondary housing that plugs said main housing, a static gasket being disposed between said main housing and said secondary housing.

19. A hydraulic distributor according to claim 16, wherein said main distributor member has an end portion that projects from said emergency distributor member, said lever being U-shaped in order to go round said end portion.

20. A hydraulic distributor according to claim 16, wherein said at least one magnetic lens is directed towards said reed switch and is perpendicular to a longitudinal axis of said reed switch.

* * * * *